United States Patent
Gladieux

[11] 3,899,257
[45] Aug. 12, 1975

[54] DEVICE FOR FIXING A ROTOR ON A ROTATABLE SHAFT

[76] Inventor: Andre Gladieux, 97, Avenue de la Republique, Paris, France

[22] Filed: Mar. 13, 1973

[21] Appl. No.: 340,651

[30] Foreign Application Priority Data
Mar. 17, 1972 France .................... 72.09541

[52] U.S. Cl. .............. 403/259; 403/260; 403/261; 403/365; 403/371
[51] Int. Cl.² ........................................ F16D 1/06
[58] Field of Search .......... 403/192, 259, 260, 261, 403/365, 370, 371; 308/244

[56] References Cited
UNITED STATES PATENTS

| 963,935 | 7/1910 | Parker | 403/370 |
| 1,225,113 | 5/1917 | Davie | 308/244 |
| 1,359,438 | 11/1920 | Sharpnack | 308/244 |
| 2,574,773 | 11/1951 | Bannister | 287/53 |
| 3,656,785 | 4/1972 | Lother | 403/370 |

Primary Examiner—Richard J. Scanlan, Jr.
Assistant Examiner—Conrad L. Berman
Attorney, Agent, or Firm—Bucknam and Archer

[57] ABSTRACT

A model internal combustion engine has a tapped bore at the free end of the crankshaft to receive a screw, and has a sleeve with a stepped bore and conical outer surface mounted on the end of the crankshaft with a conical-bored ring carried on the sleeve. A propeller is clamped between the screw head and the ring.

1 Claim, 1 Drawing Figure

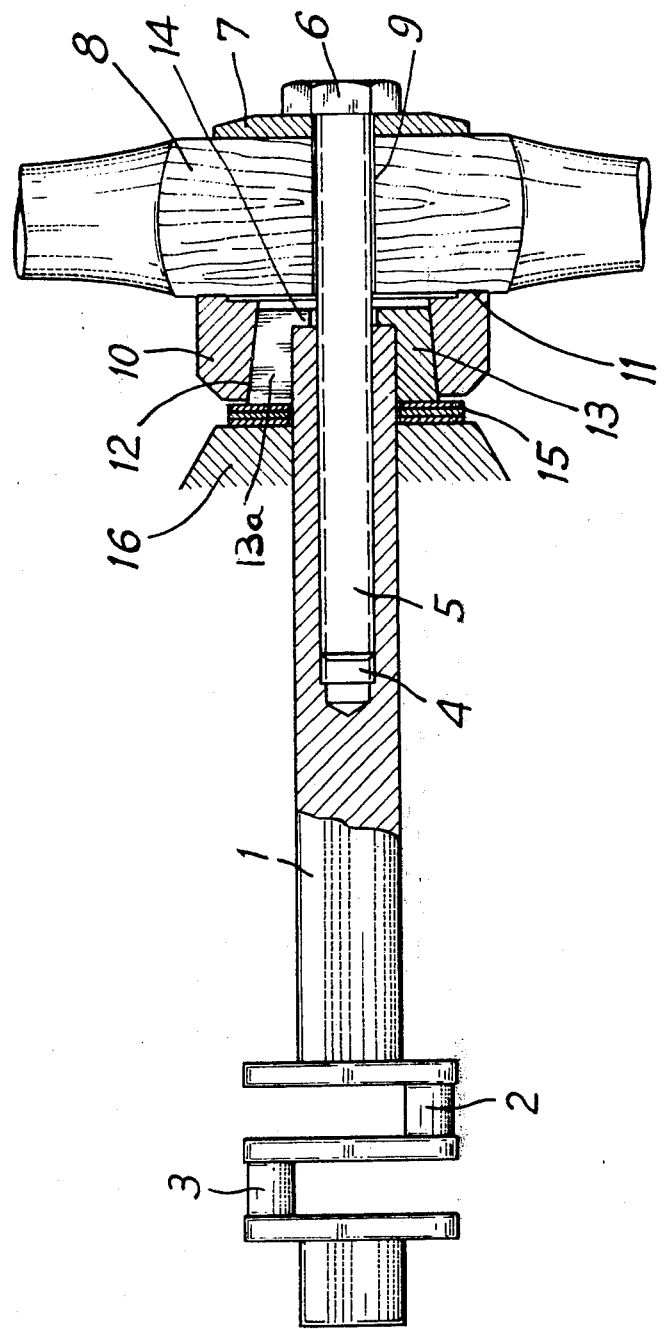

DEVICE FOR FIXING A ROTOR ON A ROTATABLE SHAFT

The present invention relates to a device for fixing a rotor on the end of a rotatable shaft.

It is known, in small model internal combustion engines intended to power small models of aeroplanes, to have a crankshaft extension onto which a propeller is fixed by means of a screw and a tightening washer, the screw shank being received in a threaded bore of the crankshaft extension.

However, this arrangement has a serious disadvantage in that when the machine model aeroplane crash lands, the propeller can strike against the ground and cause deformation of the crankshaft making replacement necessary. Such a main component of the model engine is of course rather expensive to replace.

The mounting device according to the present invention makes it possible to overcome this disadvantage due to the fact that only the attachment screw will be damaged and that this is a component which can be replaced easily.

According to one aspect of the present invention, there is provided a model internal combustion engine, having a crankshaft, a back up ring on the crankshaft, and means for clamping a propeller against the back up ring, the back up ring being removable from the crankshaft to allow adjustment of clearance between the back up ring and the crankcase.

According to a second aspect of the present invention there is provided a model internal combustion engine including one or more shims between the back up ring and crankcase front end.

Preferably the device is used to fix a propeller to the crankshaft of a model internal combustion engine and it is possible to adjust the longitudinal clearance of the front end of the crankshaft in its bearings by means of shims located between the crankshaft bearing and the said sleeve which bears against the end of the shaft.

In order that the present invention may be better understood the following description is given; merely by way of example, referring to the attached drawing, in which the sole FIGURE is a cross-sectional view of one embodiment of the device for mounting a propeller on the end of a crankshaft in accordance with this invention.

In the drawing, a crankshaft of a small model internal combustion engine has at one end crankpins 2 and 3 and at the other end, a tapped hole 4 to receive a screw 5. The screw 5 fits in a bore 9 of a propeller 8 which is held tightly by the screw 5 between an outboard washer 7 and an inboard ring 10 which has an annular milled zone 11 against which the propeller 8 rests.

The ring 10 has a conical bore 12 which fits on a corresponding outer conical circular surface of a sleeve 13 longitudinally slit at 13a and mounted on the end of the crankshaft 1 and having a shoulder 14 which bears against the end of the crankshaft 1. When the propeller 8 is in place and the screw 5 tightened, the ring 10 and sleeve 13 are first of all urged leftwardly until shoulder 14 abuts the end of the crankshaft 1 after which further tightening of screw 5 causes the interfitting conical faces of the ring and sleeve to compress the slit sleeve 13 circumferentially to close the slit 13a and to cause the sleeve 13 to grip the crankshaft 1 tightly like a drill chuck would.

In order to adjust the longitudinal clearance at the front end of the crankshaft 1 in its bearings, shims 15 of adjustable thickness are located between the inboard end of sleeve 13 and the bearing or casing 16 of the engine. Since the crankshaft 1 is located in the engine by means of its connecting rod bearings it is possible to adjust the longitudinal clearance at the propeller end by changing the number and the thickness of the shims 15.

In practice virtually all the clearance at the front end of the crankshaft will be taken up by suitable selection of the shims 15. It should of course be remembered that since in flight the thrust of the propeller will be urging the crankshaft 1 rightwardly to pull the sleeve 13 clear of the shims 15 there will in practice be little likelihood of friction drag of the shims 15 on the sleeve 13 and crankshaft 1.

However, in the event of a crash landing and impact of the propeller blade tips with the ground the existence of the shims 15 leaving little or no clearance between the crankcase front end and the "back up ring" assembly 10, 13, on the crankshaft will mean that any tendency to deflect the propeller out of its normal tip path plane will result in, at worst, tensile deformation of the securing screw 5. There can be no flexural distortion of the crankshaft front end because the tightness of fit at the shims 15 precludes the closing together of the sleeve 13 and crankcase front wall which must occur if such flexural deformation is to take place.

By providing a removable "back up ring" assembly 10, 13 in place of the conventional fixed back up ring used in model internal combustion engines, the present invention enables a suitable selection of shims to be employed and for the overall thickness of the set of shims to be adjusted, to compensate for wear occurring during the life of the engine, without the need for the entire engine to be dismantled.

Eliminating clearance at the front end of the engine crankshaft also has the advantage of avoiding the possibility of the crankshaft being knocked back into the crankcase in the event of an accidental impact on crash landing. Such "knocking back" of the shaft would tend to dislocate the "big end" connection between the crankshaft and the connecting rod.

I claim:

1. In a model internal combustion engine having a crankcase and a crankshaft which protrudes from said crankcase, the improvement which comprises a tapped bore in the end of the crankshaft protruding from the crankcase, a sleeve surrounding said protruding end of the crankshaft, means defining a stepped bore in said sleeve with a larger diameter portion receiving said crankshaft and a smaller diameter portion, a shoulder between said larger and smaller diameter portions of the stepped bore abutting the end face of the crankshaft at the protruding end thereof, means defining a conical outer surface on said sleeve, means defining a slit extending longitudinally through said sleeve and extending between the stepped bore and conical outer surface thereof, a ring carried on said sleeve and having a conical bore conforming to and engaging the conical outer surface of said sleeve, a washer, a propeller received between said ring and washer, a screw extending through said washer, propeller, ring, smaller diameter portion of said sleeve and received in threaded engagement with said tapped bore to compress the propeller between said ring and washer and to thereby apply to the ring axial forces compressing and securing same against said sleeve whereby said sleeve, ring, propeller, washer, screw and crankshaft are rotatable in unison, and spacer means disposed in a clearance space between said sleeve and the crankcase to limit the bending deflection of the crankshaft portion that protrudes from the crankcase.

* * * * *